Nov. 3, 1936.  J. P. COLBOURN  2,059,995
COOKING UTENSIL WITH REMOVABLE IMMERSIBLE ELECTRICAL HEATING UNIT
Filed March 1, 1935
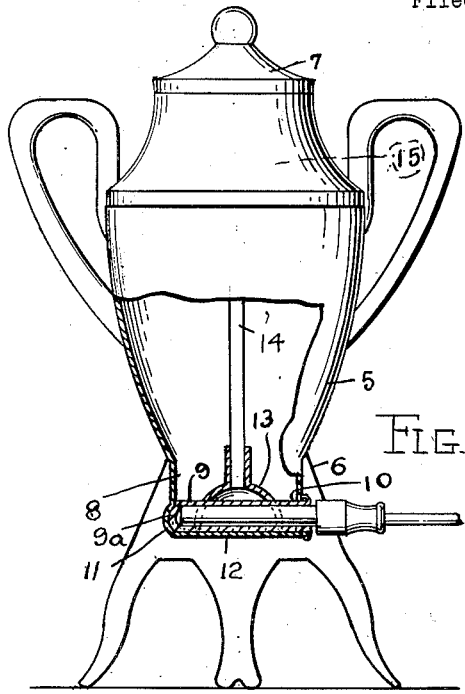
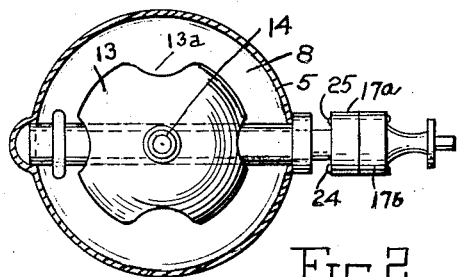
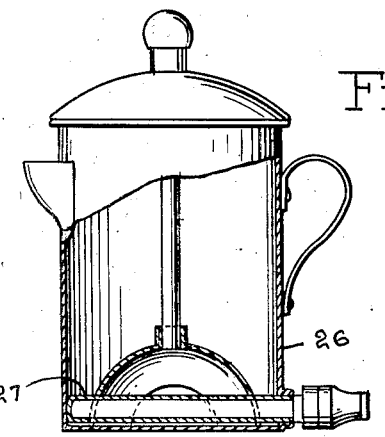
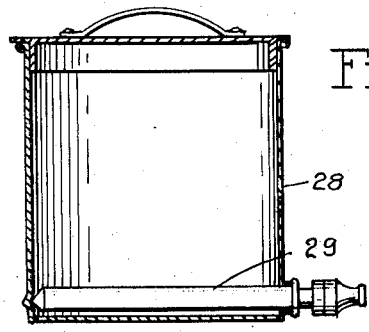
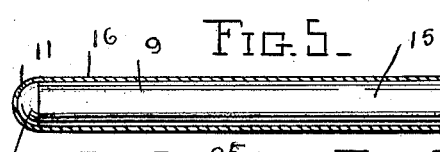
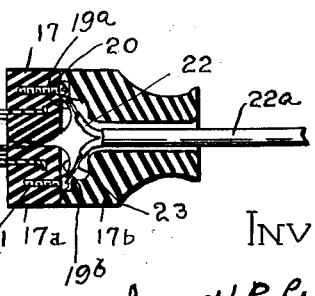
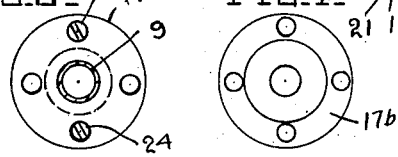
INVENTOR
James P. Colbourn.

Patented Nov. 3, 1936

2,059,995

UNITED STATES PATENT OFFICE 2,059,995

COOKING UTENSIL WITH REMOVABLE IMMERSIBLE ELECTRICAL HEATING UNIT

James P. Colbourn, New York, N. Y.

Application March 1, 1935, Serial No. 8,868

1 Claim. (Cl. 219—43)

This invention relates to improvements in electrically heated cooking utensils and one of its objects is to provide a cooking utensil or percolator for coffee with an immersed electrical heating unit which can be inserted in a tube mounted transversely of the vessel or utensil, and withdrawn from this tube to permit of cleaning of the utensil or vessel, without exposing the unit to the influence of the cleansing fluid or water.

Another object of the invention is the provision of a cooking vessel or utensil with a heater which can be wholly surrounded by the fluid to be heated, and withdrawn transversely of the vessel or utensil, to permit of complete cleaning of the vessel or utensil.

A further object of the invention is to provide an electrical heating unit which can be removed from its holder, when it has been exhausted from use.

With the above and other objects in view the invention consists in certain new and useful constructions and combinations of parts, clearly described in the following specification, and fully illustrated in the accompanying drawing, in which:—

Fig. 1 is a side view of a coffee percolator, shown partly in vertical section.

Fig. 2 is a transverse sectional view thereof, taken on line 2—2 of Fig. 1, looking in the direction of the arrows.

Fig. 3 is a side view, partly in longitudinal section of a modified form of a cooking vessel or percolator.

Fig. 4 is a similar view of another form of a cooking utensil.

Fig. 5 is a longitudinal sectional view through the improved heating unit, shown assembled for insertion.

Fig. 6 is an end view of the holder with the heating unit withdrawn, and

Fig. 7 is an end view with the heating unit in place.

Referring to the accompanying drawing illustrating the practical application of the invention 5 designates the vessel or body of a percolator, which is supported on the stand 6, and provided with a detachable cover 7. In this type of percolator the lower part of the vessel is usually reduced to provide a chamber 8 smaller in diameter than the widest part of the percolator, so that the energy of the heat generated by the electrical unit may be concentrated upon a smaller volume of water, and a quicker lifting flow thereby induced.

In this chamber 8 a metal tube 9 is inserted through an opening 10 formed in one side of the wall thereof. This tube is preferably formed with a closed inner end 11, so that its interior will be completely sealed from the fluid contents of the vessel. The outer end of the tube 9 is hermetically sealed to the wall of the vessel, by welding, brazing, or by double seaming, or otherwise, so that no leakage is possible through the opening 10. The inner end of the tube 9 may be supported by the drawn pocket 9a, or by the saddle 9b, designed to engage the bottom 12 of the vessel. The tube 9 is located a slight distance above the bottom, so that water may circulate freely around this tube.

The inverted dome or bell 13 of the percolator unit is disposed over the tube 9, and is constructed with water openings 13a in its wall, to permit of water freely flowing into the bell. This bell is connected by any sort of coupling or connection to the lift tube 14, which discharges into the coffee holding vessel 15, the body of which is constructed with the usual perforated bottom.

In the tube 9 the holder 15 of the electrical unit is inserted, through the open outer end of the tube 9. This holder includes the tube 16 and the electrical plug 17. The tube 16 is closed at one end 18 and at the other end is detachably connected to the plug 17, which is formed in two sections 17a and 17b. The electrical unit 19 is enclosed in the tube and its terminal wires 19a and 19b are connected to the binding screws 20 and 21, which are also connected to the cord or line wires 22 and 23.

By separating the plug sections 17a and 17b from each other, by means of the screws 24 and 25, which unite the same, the plug parts may be opened up and the electrical unit 19 may be withdrawn and a fresh unit placed in position.

In Fig. 3 I show a modified form of the cooking utensil, wherein a conventional coffee percolator 26 is equipped with the transverse tube 27, inserted through an opening formed in the wall of the vessel, and hermetically sealed to the vessel. In this tube the combined electrical unit and holder is inserted.

In Fig. 4 I show a conventional cooking pot 28, which is equipped with a similar protecting tube 29, in which the combined electrical heating unit and the holder is inserted.

In each case the electrical heating unit is enclosed by a double tube, which is immersed in the water filling the vessel or utensil. The water when heated circulates around the heating unit, which in every case is located above the bottom or lowest point of surface contact of the water.

There is nothing to insulate the heat generated from the water, and there is direct exchange of the heat generated with the water.

When it is desired to clean the vessel or cooking utensil so equipped, the holder and the heating unit is withdrawn, thus removing all electrical connections and wiring from the vessel or utensil. When this is done the vessel or utensil may be immersed in the cleansing bath or water, and scoured like any ordinary vessel or utensil, without danger of impairing the electrical contacts or wiring.

Due to the fact that the electrical unit is immersed in the water, less current will be consumed in the heating of the contents of the vessel or utensil. The heat must be first absorbed by the water before it is communicated to the vessel, while in forms of electrically heated utensils now on the market the vessel is first heated, so that a large amount of heat is radiated to the atmosphere before it is absorbed by the water.

Various changes in the details of construction may be resorted to, without departing from the general scope of the invention, as defined in the claim annexed hereto.

Having described my invention I claim:—

A cooking utensil consisting of a vessel having a bottom wall and a side wall, the side wall having an opening located slightly above the bottom wall, a tube inserted through the opening into the vessel and located above the bottom wall to leave an unobstructed water space between the tube and the bottom wall, the inner end of the tube being closed, the outer end of the tube being double seamed to the side wall of the vessel and permanently united to the vessel so as to hermetically seal said opening, a percolator bell straddling the tube and equipped with a vertical lift tube, and a combined holder and electrical unit inserted in the tube and withdrawable therefrom to permit the cleansing of the vessel.

JAMES P. COLBOURN.